June 16, 1953  L. G. SAYWELL  2,642,298
SEALING ASSEMBLY
Filed Sept. 29, 1947
FIG_1_
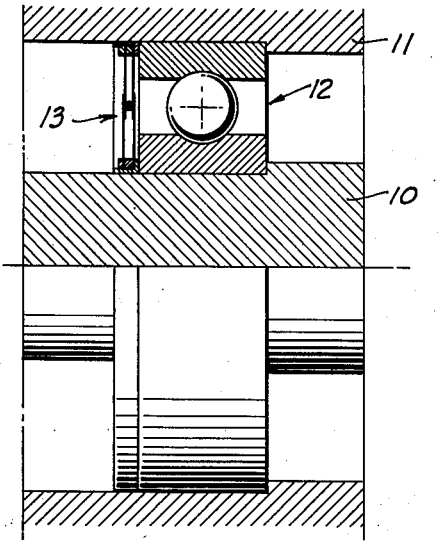
FIG_2_
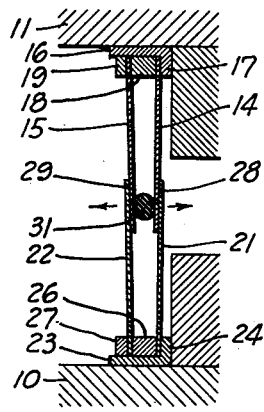
FIG_3_
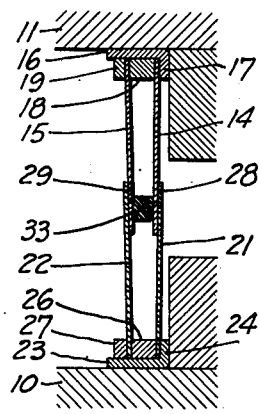
FIG_4_
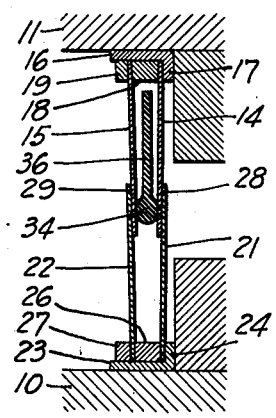
FIG_5_
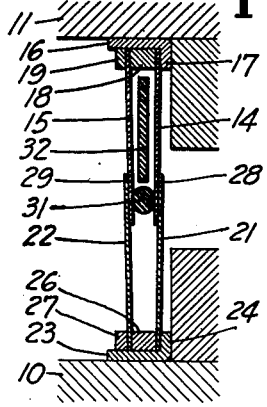
FIG_6_
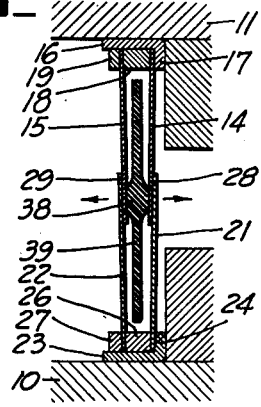
INVENTOR
Lawrence G. Saywell
BY
Flehr & Swain
ATTORNEYS Patented June 16, 1953

2,642,298

UNITED STATES PATENT OFFICE 2,642,298

SEALING ASSEMBLY

Lawrence G. Saywell, San Mateo, Calif., assignor to Saywell Associates, South San Francisco, Calif., a joint venture Application September 29, 1947, Serial No. 776,733

4 Claims. (Cl. 286—11)

This invention relates generally to devices intended to be inserted into an annular space between outer and inner concentric parts to provide a fluid-tight seal. Such devices have useful application for example to prevent leakage of oil or lubricant from shaft bearings or bearing assemblies.

In my copending application Serial No. 618,729 filed September 26, 1945, Patent No. 2,428,041, there is disclosed a type of sealing device intended for installation in conjunction with shaft bearings or assemblies, which includes outer and inner structures having elements in overlapping relation, thereby providing a plurality of annular sealing areas. Certain of the preferred embodiments disclosed in said patent utilize annuluses made of relatively thin spring metal which have overlapping portions forming the annular sealing areas, and stressed laterally whereby said areas are "loaded" and maintained in sealing engagement. With such a sealing device it is essential that some pressure between overlapping portions of the annuluses be maintained irrespective of slight endwise movements of the shaft, or slight eccentricity or misalignment.

The present invention has for its object the provision of special and improved means for producing and maintaining the desired loading between the annuluses. According to the present invention a supplemental means is used in obtaining and maintaining the desired loading without relying entirely upon stressing of the annuluses, and this supplemental means does not interfere with maintenance of the desired loading between the annular sealing areas irrespective of substantial endwise movements of the shaft.

Further objects and features of the invention will appear from the following description in which the preferred embodiments have been set forth in detail in conjunction with the accompanying drawings.

Referring to the drawings:

Figure 1 is a side elevational view, partly in section, illustrating one of the present devices installed in conjunction with a ball bearing assembly.

Figure 2 is an enlarged detail section illustrating one embodiment of the invention.

Figure 3 is a view like Figure 2 showing a second embodiment of the invention.

Figure 4 is a view like Figure 2 showing a third embodiment of the invention.

Figure 5 is a view like Figure 2 showing a fourth embodiment of the invention.

Figure 6 is a view like Figure 2 showing a fifth embodiment of the invention.

In Figure 1 I have shown a typical shaft 10 disposed concentrically within the outer housing 11, and in conjunction with the roller or ball bearing assembly 12. One of my devices 13 is shown installed in the annular recess between the shaft and the outer part 11, and in proximity with the bearing assembly. When so installed the device serves to prevent leakage of oil or grease from the bearing.

Referring to Figure 2 the sealing device 13 consists of an outer structure including the annuluses 14 and 15, which are carried by the rigid metal mounting ring 16. The outer periphery of annulus 14 is seated against the mounting ring flange 17, a spacer ring 18 is inserted between the annuluses, and the annuluses together with the spacer ring 18 are held in assembled relation by the retention ring 19. Ring 16 has a fluid-tight fit within the bore of the outer part 11, and likewise the annuluses are in fluid-tight relationship with respect to the mounting ring.

The inner structure includes the annuluses 21 and 22 which are carried by the mounting ring 23. Mounting ring 23 has a fluid-tight fit upon the shaft 10. Annulus 21 is seated upon the mounting ring flange 24, and the assembly of the inner structure is completed by the spacer ring 26, and the retention ring 27.

All of the annuluses 14, 15, 21 and 22 are formed of suitable resilient material which can be stressed laterally, as for example relatively thin flexible sheet metal. Thus they can be formed of suitable spring metal or metal alloys such as high carbon steel, phosphor bronze, or one or more of the so-called stainless-steel. For the more common sizes of shafts thickness of the metal annuluses may for example be of the order of 0.003 inch.

It will be noted that the edge portions of the annuluses overlap on the annular sealing areas 28, 29. It is with respect to these sealing areas that loading pressure must be maintained between the annuluses in order to maintain a proper seal.

Instead of relying entirely upon lateral deflection of the annuluses to maintain the loading pressure on the areas 28 and 29, I provide a ring 31 which is inserted between the annuluses 14 and 15, in an annular region adjacent to the means diameter of the sealing areas 28 and 29. In the embodiment of Figure 2 this ring is circular in cross-sectional contour, and it is formed of suitable resilient material, such as a resilient synthetic rubber capable of withstanding oil or grease. The purpose of the insert ring 31 is to apply oppositely directed forces to the adjacent portions of the annuluses 14 and 15, and to oppose the inwardly directed forces applied by the adjacent overlapping portions of the stressed annuluses 21 and 22.

Various proportionings can be utilized with the embodiment of Figure 2 to secure the desired results. For example in one instance the spacer rings 18 and 26 have the same width, and the insert ring 31 has a substantially greater width, whereby it serves to spread the annuluses 14 and 15 and urge the same into sealing engagement with the overlapping portions of the annuluses 21 and 22. Instead of such proportioning, however, it is possible to dimension the ring 31 so that it has a diameter substantially the same as the width of spacer 18, and to form the spacer 26 of somewhat lesser width thereby the annuluses 21 and 22 are necessarily deflected and stressed in opposite directions. In this instance stressing of the annuluses 21 and 22 serves to provide the desired loading force, but the pressure thus applied to the annuluses 14 and 15 is accommodated to a substantial degree by forces applied in opposite directions to the insert ring 31.

In general the similar arrangement for Figure 2 is that first described, namely to dimension the ring 31 whereby with spacer rings 18 and 26 of the same width, the annuluses 14 and 15 are spread to stress the annuluses 21 and 22, thus causing the desired degree of loading upon the sealing areas 28 and 29. Irrespective of which arrangement is used however effective pressure will be maintained between the overlapping portions to maintain the desired seal, and the device will accommodate substantial endwise movement of the shaft without disrupting the desired seal. This is because the ring 31 does not interfere with simultaneous flexing of the annuluses 14 and 15 toward one direction or the other, such as is required to accommodate endwise movement of the shaft.

The embodiment of Figure 3 is similar to Figure 2. However, in this case the ring 33, corresponding to the ring 31 in Figure 2, is square or rectangular in cross-sectional contour. Instead of forming such a ring of resilient material, it can be formed of a suitable plastic or composition, in which event its resilience is not relied upon to maintain loading, but reliance is made upon the deflection and stressing of the annuluses 21 and 22.

In the arrangement of Figure 4 the ring 34, corresponding to ring 31 of Figure 2, is formed as a bead upon the inner peripheral edge of the flat annulus 36. Member 36 is loosely disposed between the annuluses 14 and 15, and serves to insure retention of the ring 34 in proper position. Member 36 and the bead portion or ring 34 can be formed of resilient material such as synthetic rubber, or of relatively rigid materials such as a suitable molded plastic or composition.

In the arrangement of Figure 5 the ring 31 is the same as in Figure 2, but in order to insure its retention in proper position, an additional annulus 32 is provided and which is loosely disposed between the annuluses 14 and 15. The inner diameter of annulus 32 is substantially the same or only slightly greater than the outer diameter of ring 31, whereby it serves to retain the ring 31 in proper position.

In the embodiment of Figure 6 the ring 38, corresponding to the ring 31 of Figure 2, is formed as an enlargement upon the annulus 39. This annulus extends loosely between both the outer and inner structures, and may be formed of resilient rubber, or of relatively rigid plastic material. It will be evident that an annulus of this type not only serves to retain the portion 38 in proper operating position, but in addition it greatly stiffens the entire device, thus enabling it to withstand higher fluid pressures.

I claim:

1. In a sealing device for establishing a fluid tight seal between relatively rotatable inner and outer parts having an annular space therebetween for receiving said sealing device, said device comprising an outer sealing structure adapted to be carried by said outer part in fluid tight relation therewith, said structure including a pair of annuluses formed of thin spring metal and spaced apart in the direction of the shaft axis, an inner sealing structure adapted to be carried by said inner part in fluid tight relation therewith, said inner structure including a pair of spaced annuluses formed of thin spring metal having their outer peripheral margins in overlapping relationship and in sealing contact with the inner peripheral margins of the first pair of annuluses, one pair of said annuluses having both its said margins disposed exterior to the assembly and engaging the outer faces of the other pair of annuluses, said one pair of annuluses being stressed laterally in opposite directions to urge the said margins of the same into sealing engagement with the overlapping margins of the other pair, a thrust receiving ring inserted between and with its sides in contact with the innermost overlapping margins of the spring metal annuluses, the ring being formed as an annular body having an uninterrupted thickness corresponding generally to the spacing between the annuluses and serving to receive thrust applied in compression to the opposed sides of the body, and supplemental means inserted between said spring metal annuluses and serving to retain said thrust receiving ring against radial displacement.

2. A sealing device as in claim 1 in which the spring metal annuluses of the outer structure exteriorly overlap the said margins of the inner spring metal annuluses, and in which said supplemental means is disposed between the annuluses of the outer structure.

3. A device as in claim 1 in which said thrust receiving ring is an annulus formed of resilient material.

4. A device as in claim 1 in which said supplemental means is an annulus having an effective thickness less than the thickness of said ring.

LAWRENCE G. SAYWELL.

References Cited in the file of this patent

UNITED STATES PATENTS

| Number | Name | Date |
|---|---|---|
| 1,505,321 | Dennedy | Aug. 19, 1924 |
| 1,626,237 | Hodgkinson | Apr. 26, 1927 |
| 1,740,428 | Knox | Dec. 17, 1929 |
| 1,780,248 | Spreen | Nov. 4, 1930 |
| 2,301,654 | Yauch | Nov. 10, 1942 |
| 2,393,779 | Hunter | Jan. 29, 1946 |
| 2,428,041 | Saywell | Sept. 30, 1947 |